(No Model.)
S. C. HAUBERG.
CENTRIFUGAL CREAMER.
No. 498,914. Patented June 6, 1893.
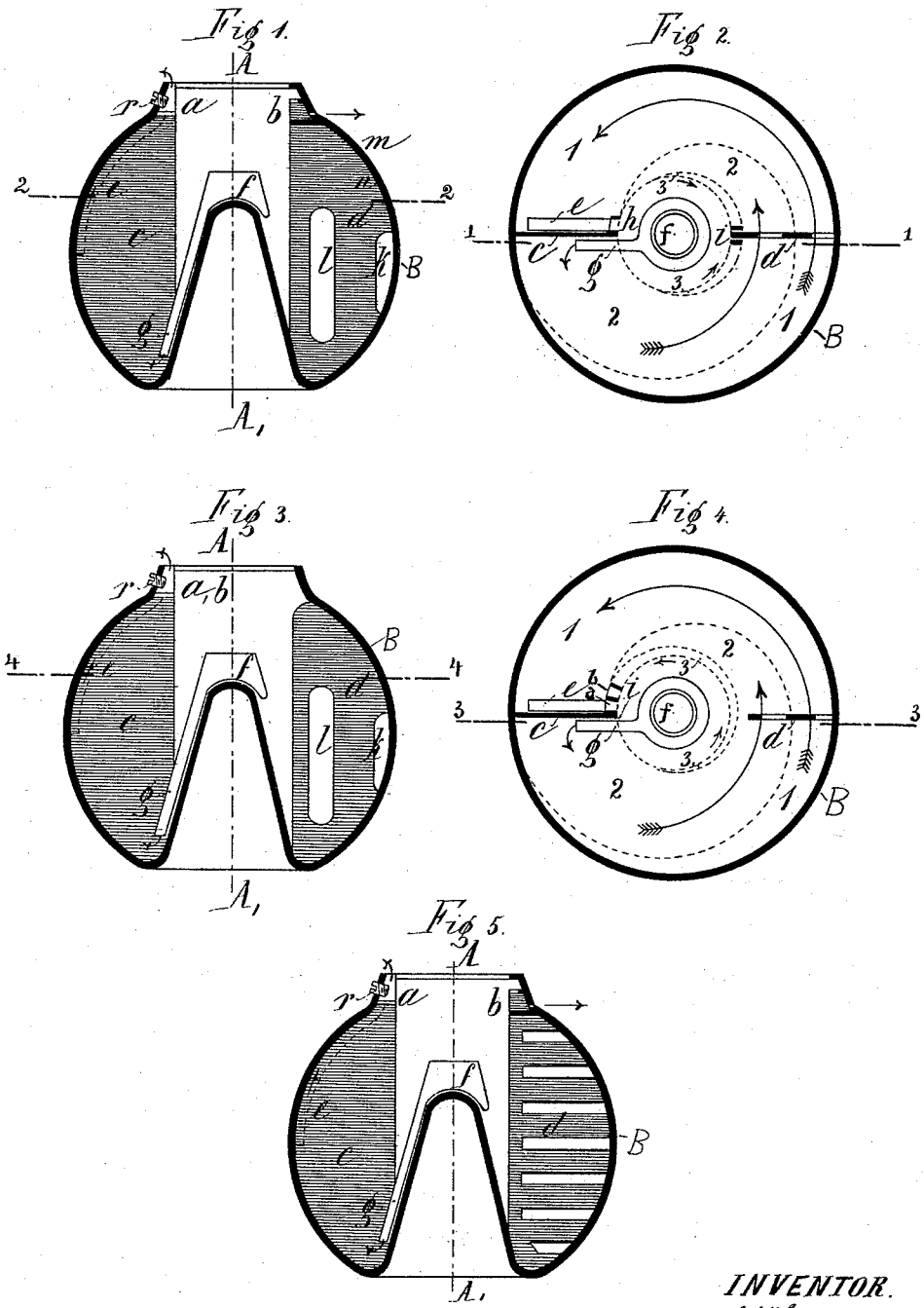
WITNESSES:
Marion Hall
Charles Schroeder.
INVENTOR.
S. C. Hauberg.
BY
Goepel & Raegener
ATTORNEYS.
THE NORRIS PETERS CO., PHOTO-LITHO., WASHINGTON, D. C.

UNITED STATES PATENT OFFICE.

SOPHUS CHRISTOPHER HAUBERG, OF COPENHAGEN, DENMARK.

CENTRIFUGAL CREAMER.

SPECIFICATION forming part of Letters Patent No. 498,914, dated June 6, 1893.

Application filed December 1, 1890. Serial No. 373,182. (No model.) Patented in England September 5, 1889, No. 13,981; in Germany September 6, 1889, No. 57,486; in Norway September 9, 1889, No. 1,679; in Sweden September 10, 1889, No. 2,524; in France January 18, 1890, No. 203,237; in Italy September 25, 1890, 28,239/308; in Switzerland December 6, 1890, No. 3,231, and in Belgium June 5, 1891, No. 95,143.

*To all whom it may concern:*

Be it known that I, SOPHUS CHRISTOPHER HAUBERG, a citizen of Denmark, residing at Copenhagen, Denmark, have invented certain new and useful Improvements in Centrifugal Creamers, (for which I have obtained Letters Patent in the following foreign countries, to wit: England, No. 13,981, of September 5, 1889; Germany, No. 57,486, of September 6, 1889; Sweden, No. 2,524, of September 10, 1889; Norway, No. 1,679, of September 9, 1889; France, No. 203,237, of January 18, 1890; Italy, No. 28,239/308, of September 25, 1890; Switzerland, No. 3,231, of December 6, 1890; Belgium, No. 95,143, of June 5, 1891;) and I do declare the following to be a full, clear, and exact description of the invention, such as will enable others skilled in the art to which it appertains to make and use the same.

Figure 1 is a vertical transverse sectional view of my improved rotating cylinder for centrifugal machines, on the line 1 1, of Fig. 2. Fig. 2 is a horizontal sectional view, on the line 2 2, of Fig. 1. Fig. 3 is a vertical transverse sectional view, on the line 3 3, of Fig. 4. Fig. 4 is a horizontal sectional view, on the line 4 4, of Fig. 3, and Fig. 5 is a vertical transverse sectional view, showing a modified construction.

Similar letters and numerals of reference indicate corresponding parts.

B represents the so-called rotating cylinder of the centrifugal machine, of which cylinder the dotted line A A' is the central axis. The cylinder B is provided with the milk outlet $a$ connected with the milk outlet tube $e$, through which tube $e$ and opening $a$ the skimmed milk is conducted from the cylinder. The cylinder B is provided opposite to the outlet $a$ with the cream-outlet $b$. The cylinder contains two opposite wings or partitions $c$ $d$, placed radially and extending from the sides of the cylinder to a short distance from the center. The wing or partition $c$ is solid, and the wing or partition $d$ is provided with the apertures $l$ and $k$. In place of giving the apertures $l$ and $k$ the shape shown in Figs. 1 to 4, they may be shaped as shown in Fig. 5.

$f$ represents the funnel on the central portion in the bottom of the cylinder B, from which funnel the milk is conducted through the pipe $g$ to the bottom of the cylinder. The milk-outlet $a$ may be provided with a regulating screw $r$.

Figs. 3 and 4 show the milk-outlet $a$ and the cream-outlet $b$ side by side. Figs. 2 and 4 show the coils of the full milk, skimmed milk and cream in the cylinder. When the milk outlet $a$ and the cream outlet $e$ are opposite each other as shown in Fig. 2, the skim milk 1, the full milk 2 and the cream 3 pass in the direction indicated by the arrows in that figure, and when the milk outlet and the cream outlet are placed side by side as shown in Fig. 4, the skim milk 1, the full milk 2, and the cream 3 pass in the directions indicated by the arrows in that figure, toward their several outlets. When the full milk enters the cylinder through the pipe $g$ the full milk is in that part of the cylinder nearest the pipe $g$, and the particles of cream or fat in the same have not yet had time to separate from the milk; that is to say, the full milk has not had time to subdivide itself into skimmed milk and cream. Under the influence of the centrifugal force the milk, which is moved in the direction of the arrows toward the outlet-openings, rapidly begins to yield up its particles of fat, and these at once begin to travel toward the center, the skimmed milk retaining near the walls of the cylinder. As the milk continues to move in the direction indicated, more and more particles of fat have time to accumulate in the innermost ring of fluids; that is to say, in the cream layer 3, which also moves toward the cream-outlet $b$. The thickness of the layer of cream increases toward the cream-outlet, and the thickness of the layer of skimmed milk increases toward the milk-outlet.

As stated above, 1 1 represent the skimmed milk and 2 2 the layer of full milk; that is, that milk in which the particles of fat or cream are traveling toward the center. I then have the three layers: first, the layer of cream, in which the particles of cream or fat assemble; second, the layer of full milk, from which the particles of cream or fat are moving, or through which some of the particles of fat are passing; and third, the skimmed milk, from which the greater part of the particles of cream or fat have been extracted.

It is of the greatest importance to prevent the three layers from becoming mixed during their passages in the machine. For this reason, the wings c and d are so arranged that one of them, c, is entirely closed, and the inlet for the full milk is adjacent to one side of this wing and the outlet for the skimmed milk is on the opposite side of said closed wing. The second wing d has an opening k for the passage of the skimmed milk and one or more openings l, a greater or less distance from the outer edge of said wing for the passage of the full milk; that is, for milk through which the particles of cream or fat are passing.

Having thus described my invention, I claim as new and desire to secure by Letters Patent—

A rotary vessel having a free central space and provided with a solid radial partition extending from said space to the circumference, a perforated partition on the other side of the center, said perforated partition having an opening near the circumference for the passage of the skim milk, and another opening nearer its inner edge for the passage of the sweet milk, an outlet pipe for the skim-milk located on one side of the imperforate partition, a supply pipe located on the opposite side of the imperforate partition, and an outlet for the cream.

In testimony whereof I affix my signature in presence of two witnesses.

SOPHUS CHRISTOPHER HAUBERG.

Witnesses:
J. HOFMAN BANG,
TH. PETERSEN.